C. E. McCARREN.
CORN POPPING MACHINE.
APPLICATION FILED FEB. 27, 1915.
1,196,563.
Patented Aug. 29, 1916.
4 SHEETS—SHEET 1.
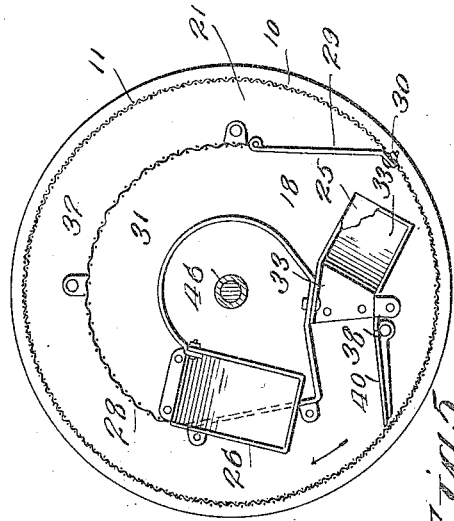
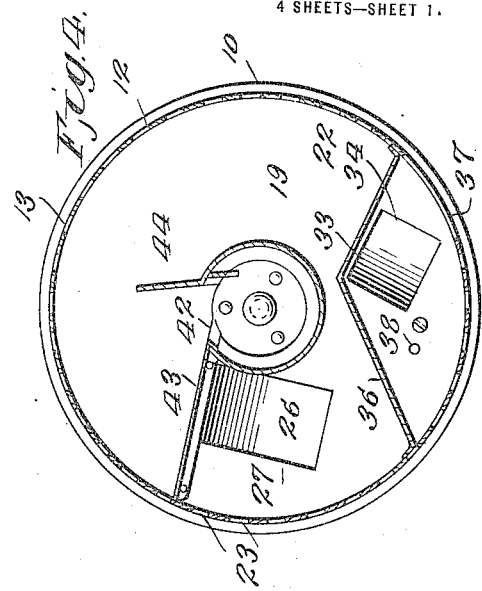
Inventor
C. E. McCarren,
By Victor J. Evans
Attorney
Witnesses
Frank Honey C. E. McCARREN.
CORN POPPING MACHINE.
APPLICATION FILED FEB. 27, 1915.
1,196,563.
Patented Aug. 29, 1916.
4 SHEETS—SHEET 2.
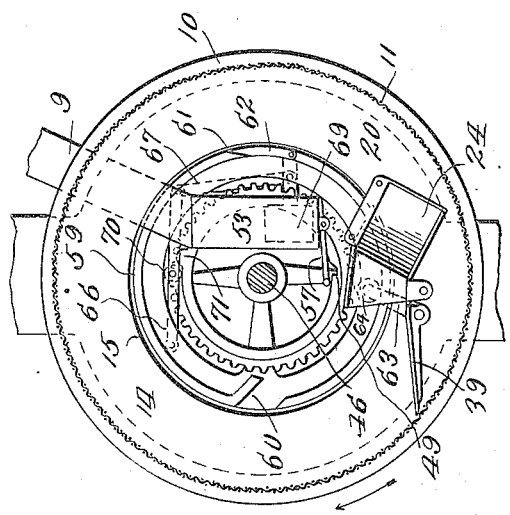
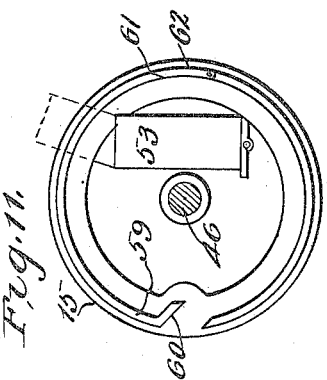
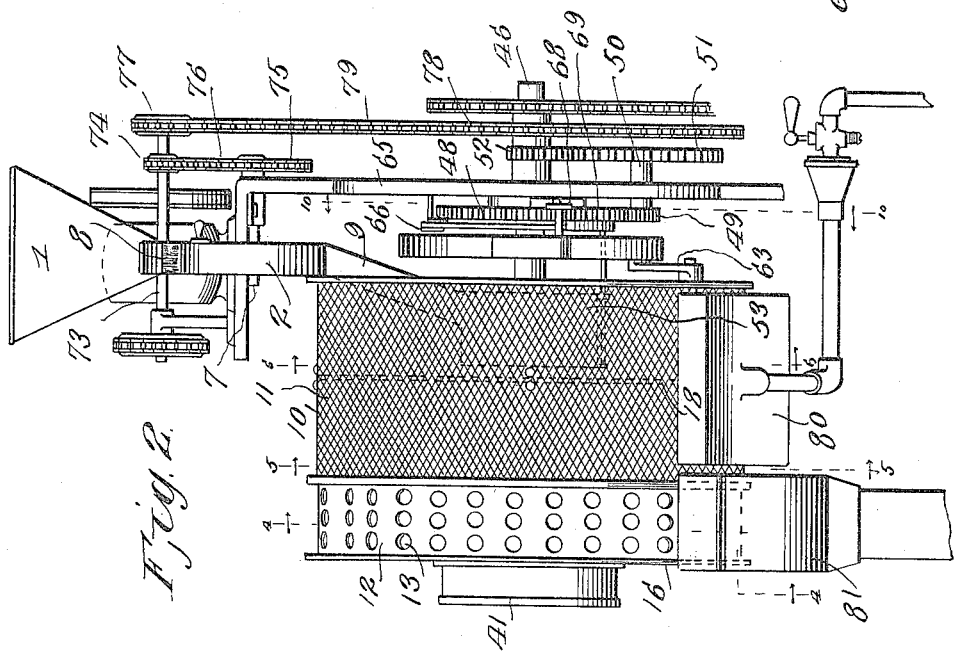
Witnesses
Frank Hough
Inventor
C. E. McCarren,
By Victor J. Evans
Attorney C. E. McCARREN.
CORN POPPING MACHINE.
APPLICATION FILED FEB. 27, 1915.
1,196,563.
Patented Aug. 29, 1916.
4 SHEETS—SHEET 3.
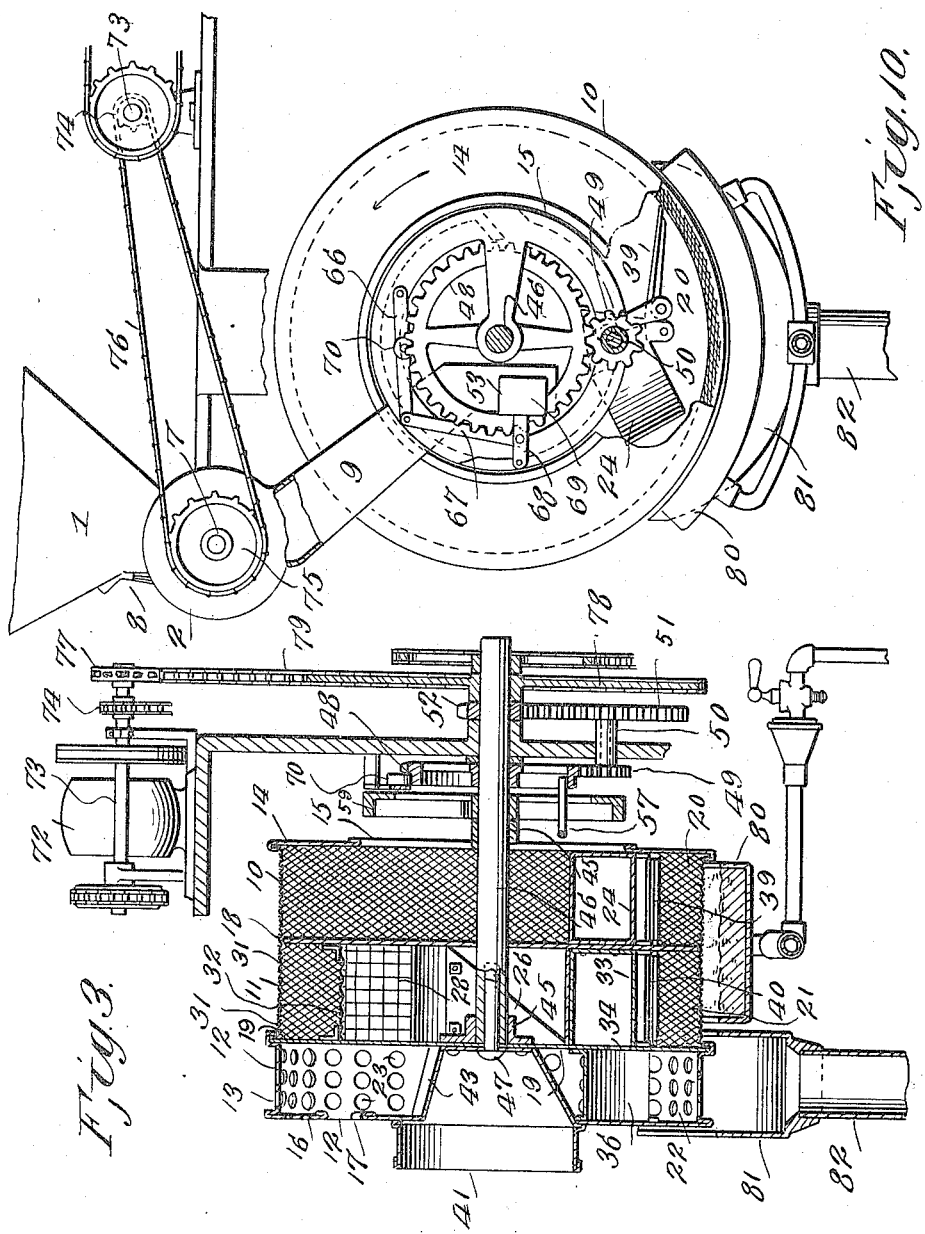
Witnesses
Frank Hough
John J. McBrety
Inventor
C. E. McCarren,
By Victor J. Evans
Attorney

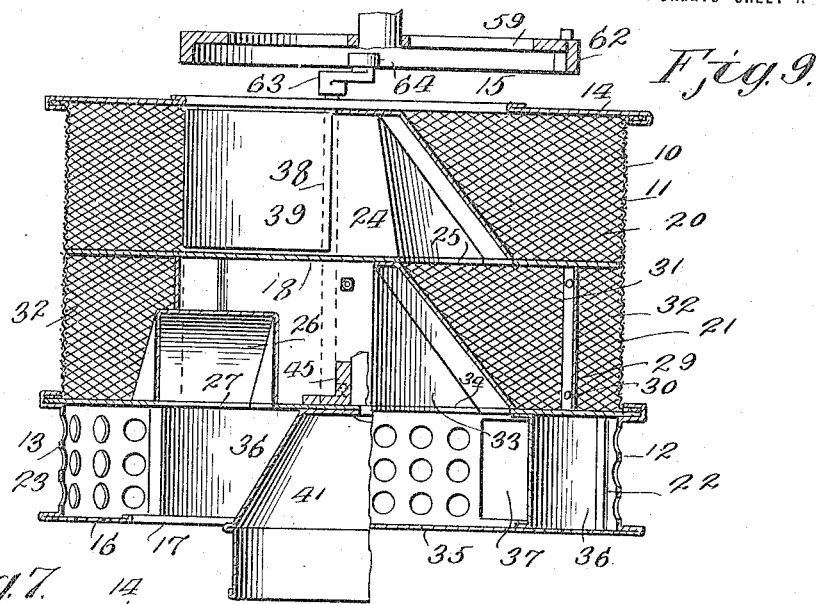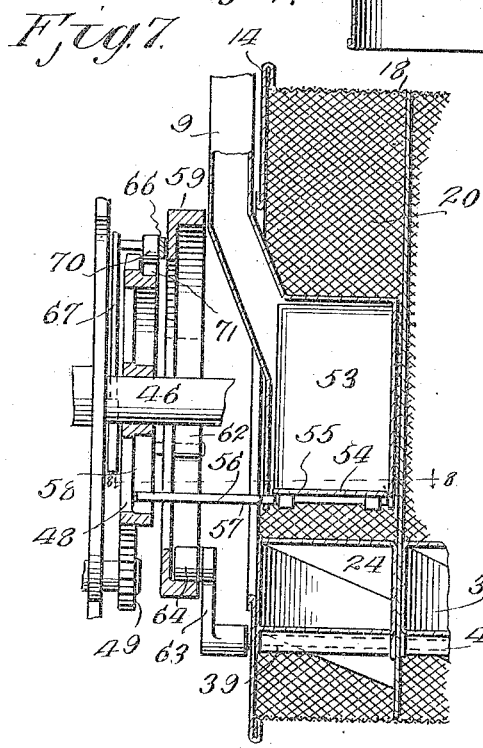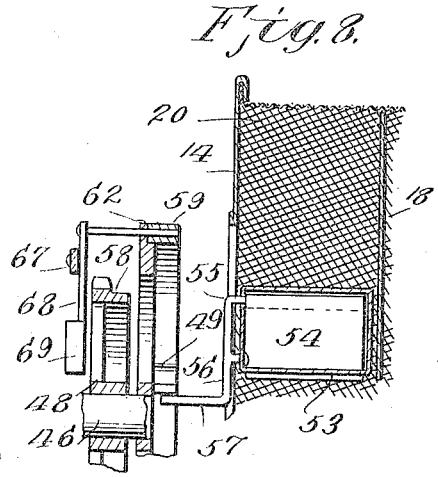

UNITED STATES PATENT OFFICE.

CHARLES E. McCARREN, OF CINCINNATI, OHIO, ASSIGNOR TO SAMUEL S. KINGERY, OF NORWOOD, OHIO.

CORN-POPPING MACHINE.

1,196,563.  Specification of Letters Patent.  Patented Aug. 29, 1916.

Application filed February 27, 1915. Serial No. 10,997.

*To all whom it may concern:*

Be it known that I, CHARLES E. McCARREN, a citizen of the United States of America, residing at Cincinnati, in the county of Hamilton and State of Ohio, have invented new and useful Improvements in Corn-Popping Machines, of which the following is a specification.

This invention relates to improvements in corn popping machines and has particular application to a power driven corn popping machine.

In carrying out the present invention, it is my purpose to provide a corn popping machine whereby the raw corn may be effectively and quickly popped and the popped corn discharged therefrom and any unpopped corn in the machine separated from the popped corn and held in the machine and subjected to the action of the heat until such unpopped corn is popped.

It is also my purpose to provide a machine wherein the corn that fails to pop may be discharged therefrom so as to prevent burning of such unpopped corn and which will be constructed in such manner that the corn will be retained therein a sufficient length of time to insure the thorough popping thereof.

A further object of my invention is to improve and simplify the general construction of corn poppers and to provide a corn popping machine which may be operated and maintained at comparatively small cost and which will operate efficiently and effectively for its intended purpose.

With the above and other objects in view, the invention consists in the construction, combination and arrangement of parts hereinafter set forth in and falling within the scope of the claims.

In the accompanying drawings; Figure 1 is a view in front elevation of a corn popping machine constructed in accordance with the present invention. Fig. 2 is a view in side elevation of the machine. Fig. 3 is a longitudinal sectional view through the popping cylinder. Figs. 4, 5 and 6 are transverse sectional views through the popping cylinder taken in parallel planes. Fig. 7 is a longitudinal sectional view through the measuring valve between the feed hopper and the popping cylinder. Fig. 8 is a transverse sectional view through such valve. Fig. 9 is a horizontal sectional view through the popping cylinder. Fig. 10 is a view in elevation of the opposite side of the machine shown in Fig. 1. Fig. 11 is a sectional view through the machine taken on a plane parallel with Fig. 6.

Referring now to the drawings in detail, 1 designates a hopper constructed of suitable material and of any desired capacity and supported by appropriate means. Disposed at the lower end of the hopper 1 and adapted to communicate therewith is a measuring valve 2 comprising a cylindrical casing 3 adapted for rotation and having the peripheral wall thereof formed with an inlet opening 4 adapted to register with the bottom of the hopper 1. Disposed within the cylindrical casing 3 and rotatable therewith is a disk 5 formed with a series of peripheral pockets 6 of different capacities respectively and each adapted to be brought into registration with the opening 4 according to the quantity of raw corn delivered from the hopper 1. This measuring valve composed of the casing 3 and disk 5 is disposed concentrically of a shaft 7 and the casing 3 is suitably fixed to the shaft to rotate therewith, while the disk 5 is capable of adjustment about the shaft and provided with means whereby such disk may be held in the desired adjusted position on the shaft so that in the rotation of the shaft the component parts of the valve will rotate simultaneously. In the present instance, the front wall of the hopper 1 at the lower edge thereof is provided with a depending brush 8 which bears upon the periphery of the casing 3 to prevent the loss of the raw corn in the rotation of the measuring valve relatively to the hopper.

9 designates a conduit having the upper end thereof disposed adjacent to the casing 3 of the measuring valve 2 and adapted to communicate with the opening 4 and pockets 6 registering with such opening of the measuring valve in the rotation of the latter to receive the raw corn carried by the valve. By means of this construction, it will be seen that when motion is imparted to the shaft 7 the measuring valve 2 will be revolved and the opening 4 and pockets 6 registering with the bottom of the hopper move out of registration with the lower end of the hopper and into registration with the upper end of the conduit 9 thereby discharging a predetermined quantity of raw corn into the conduit 9.

The lower end of the conduit 9 is disposed in one end of a popping cylinder 10. In the present instance, the popping cylinder 10 comprises a peripheral wall formed of a wide section of fine wire mesh 11 and a relatively narrow section of metal 12 formed of a band of metal perforated as at 13. Each perforation 13 is slightly greater in size than the size of the raw corn grains. The meeting edges of the fine wire mesh section 11 and the section of metal 12 are suitably fastened to each other, while secured to the remaining edge of the wire mesh section 11 is a plate 14 formed centrally with a large opening 15 concentrically of the axis of the cylinder. Similarly, the remaining edge of the metal section 12 carries a circular plate 16 formed centrally with an opening 17 concentrically of the axis of the cylinder. Disposed within the relatively wide section 11 centrally of such section is a circular division plate 18, while disposed within the cylinder at the meeting ends of the sections 11 and 12 is a circular division plate 19 spaced apart from the plate 18 and coöperating with the last-mentioned plate and the end plates 14 and 16 to divide the cylinder into three compartments 20, 21 and 22 of any desired dimensions, the compartment 20 being disposed at the rear end of the cylinder, the compartment 21 in the center of the cylinder, and the compartment 22 at the front end of the cylinder. The plate 16 of the front end of the cylinder is preferably perforated as at 23.

Secured to the rear face of the division plate 18 at a point between the center of such disk and the periphery thereof and disposed within the rear compartment 20 is a chute 24 having the mouth thereof disposed in a plane at right angles to the division plate 18 and one side opening into the center compartment 21 by way of an opening 25 in the division plate 18. Secured to the inner surface of the division plate 19 at a point between the center of such plate and the periphery thereof is a chute 26 disposed within the center compartment 21 and having the mouth thereof arranged at right angles to the division plate 19 and one side opening into the front compartment 22 through an opening 27 in the division plate 19. Secured to the outer wall of the chute 26, that is, the wall adjacent to the peripheral wall of the compartment 21 is one end of a screen 28 of coarse wire mesh and this screen is disposed between the confronting faces of the division plates 18 and 19 concentrically of the axis of the cylinder and has the remaining end thereof secured to one extremity of a plate 29, the remaining extremity of the plate 29 being fastened to the peripheral wall of the compartment 21 by means of bolts 30 or other appropriate fastening devices. The screen 28 and the plate 29 act to divide the compartment 21 into inner and outer concentrically disposed chambers 31, 32 respectively and the inner chamber 31 is adapted to receive the popped corn while the outer chamber 32 receives the unpopped corn, the unpopped corn passing through the screen 28 from the inner chamber to the outer chamber.

Secured to the inner surface of the division plate 19 at a point corresponding to the position of the chute 24 in the rear compartment is a chute 33 disposed within the center compartment 21 and having the mouth thereof disposed in a plane at right angles to the division plate 19 and one side opening into the front compartment 22 through an opening 34 at a point remote from the discharge end of the chute 26. The portion of the plate 16 opposite the opening 34 is formed with an inward extension 35 and secured to the confronting faces of the division plate 19 and plate 16 and extension 35 is a partition plate 36 acting to separate the discharge end of the chute 33 from the front compartment 22 so that the unpopped corn passing through the chute 33 will be segregated from the popped corn in the compartment 22. Contiguous to the discharge end of the chute 33, the section 12 is formed with a discharge opening 37.

Journaled in alining openings formed in the plates 16, 18 and 19 is a shaft 38 disposed adjacent to the outer edges of the mouth of the chutes 26 and 33 and fixed to the shaft 38 are shutters 39 and 40 disposed in the back and center compartments respectively and capable of swinging movement to have the outer edges thereof engaged with and disengaged from the peripheral walls of the respective compartments. When the outer edges of the shutters 39 and 40 are in engagement with the walls of the compartments the material within such compartments is directed into the chutes 24 and 33 respectively, while when the shutters are swung inwardly, such material is permitted to roll around on the peripheral walls of the respective compartments out of the range of the chutes so that in the continued rotation of the cylinder the material in the front and center compartments will remain in such compartments.

Secured to the division plate 19 and disposed within the front compartment 22 concentrically of the axis of the cylinder is a discharge hopper 41 preferably frusto-conical in shape and having the relatively small end secured to the division plate 19 and the other end projecting outwardly through the opening in the plate 16. Formed in the side wall of the discharge hopper within the front compartment is an opening 42 and extending from the opening 42 to the inner surface of the peripheral wall of the front compartment is a chute 43 adapted, in the rotation of the cylinder, to collect the popped corn in the front compartment and discharge the same into the hopper 41 whence such corn may be discharged from the cylinder.

44 designates a baffle plate secured to the wall of the opening 42 opposite from the chute 43 and acting to direct the popped corn from the chute into the hopper 41.

Suitably fastened to the division plate 18 concentrically of the axis of the cylinder and disposed within the rear compartment 20 is a bearing collar 45 and disposed within the bearing collar 45 is one end of a horizontal shaft 46 journaled in horizontally alining bearings and capable of rotary movement and supporting the cylinder 10. In the present instance, a securing bolt 47 is passed through alining openings in the plates 18 and 19 and threaded into the adjacent end of the shaft 46 to hold the cylinder upon the shaft. Loosely surrounding the shaft 46 and spaced apart a short distance from the bearing collar 45 is a spur gear 48 and meshing with the spur gear 48 is a similar pinion 49 surrounding a stub shaft 50 and fixed to a spur gear 51 also surrounding the stub shaft 50 and meshing with a pinion 52 keyed upon the shaft 46 so that in the rotation of the shaft 46 motion will be imparted to the spur gear 48 through the medium of the pinion 52, gear 51 and pinion 49.

The lower end of the conduit 9 is disposed within the rear compartment 20 and secured to the lower end of such conduit is a container 53 provided with a swinging bottom 54 and connected to the pivoted end of the bottom 54 is the crank end 55 of a rod 56. The remaining end of the rod 56 is formed with a crank 57 disposed within a groove 58 formed in the inner surface of the spur gear 48 and provided with a depression 49' in one wall thereof.

Disposed concentrically of the shaft 46 inwardly of the spur gear 48 is a stationary ring 59 formed at one side with a slot 60 having the walls thereof inclined downwardly toward the lowermost point of the ring, and at a diametrically opposite point with a slot 61 having the walls thereof inclined upwardly. Pivoted to the lower wall of the slot 61 is a gate 62 capable of swinging movement into and out of the slot and adapted to move outwardly of the ring when opening the slot 61. These slots 60 and 61 are disposed in a horizontal plane.

63 designates a crank arm secured to the outer end of the shaft 38 carrying the shutters 39 and 40. Journaled upon a crank pin at the outer end of the arm 63 is a roller 64 riding upon the ring 59 in the rotation of the cylinder 10. The rear edge of the ring 59 is preferably formed with an inwardly extending flange 65 and pivoted to the rear surface of the flange 65 is one end of an arm 66. The remaining end of the arm 66 is pivotally connected with one extremity of a link 67 and the other extremity of the link 67 is pivotally connected with an arm 68 secured to the gate 62 at the pivot point of the latter. Secured to the inner end of the arm 68 is a counter-weight 69. Journaled upon a pin carried by the arm 66 is a roller 70 disposed within the influence of a cam shoe 71 carried by the outer face of the spur gear 49 and disposed outwardly of the groove 58 in such spur gear.

In the present instance, the driving mechanism for the machine comprises an electric motor 72 connected up with a shaft 73 and adapted to drive the latter. Fixed upon the shaft 73 is a sprocket wheel 74, while mounted upon the shaft of the measuring valve is a sprocket wheel 75 and over the sprocket wheels 74 and 75 is trained an endless chain 76. Also fixed upon the shaft 73 is a sprocket wheel 77 and fixed to the shaft 46 is a sprocket wheel 78 and over the sprocket wheels 77 and 78 is trained an endless chain 79. Although I have shown and described this particular type of driving mechanism, it is conceivable that other driving means may be employed. It will be noted that the driving connections between the motor and the measuring valve and between the motor and the shaft 46 are such that the measuring valve makes a certain number of revolutions to each revolution of the shaft 46.

In practice, the raw corn is delivered from the hopper 1 by the measuring valve 2 into the conduit 9 and flows through the latter into the container 53. In the rotation of the shaft 46, motion is transmitted to the spur gear 48 as previously described and after the measuring valve has delivered a predetermined quantity of the raw corn grains to the container 53, the depression 49' is brought into registration with the crank 57 on the shaft 56, thereby relieving the crank 57 of the influence of the wall of the groove 58 and permitting the bottom 54 of the container 53 to swing to open position and so deliver the contents of the container to the rear compartment 20 of the cylinder. Normally, the roller 64 on the crank arm 63 rides over the outer surface of the ring 59 and after the cylinder has made a certain number of revolutions, dependent upon the ratio of the gearing between the shaft 46 and the spur gear 48, the cam 71 engages the roller 70 with the effect to swing the arm 66 and so actuate the gate 62 to open position, thereby enabling the roller 64 to pass through the slot 61 into the ring 59 and in the continued rotation of the cylinder the roller rides over the inner surface thereof. When the roller is riding around on the ring 59 the gates 39 and 40 are swung into engagement with the peripheral walls of the respective compartments and when the roller passes through the opening 61 and rides around the outer surface of the ring 59 the gates are swung inwardly away from the peripheral walls of the respective compartments.

Disposed below the popping cylinder 10 and encircling the lower portion of the peripheral walls of the compartments 20 and 21 is a heater 80 of any suitable or preferred construction. In the rotation of the popping cylinder the raw corn within the rear compartment 20 is subjected to the action of the heat from the heater 80 and some of such corn popped and the popped corn and unpopped grains pass through the chute 24 into the center compartment 21. In the center compartment the popped corn remains in the inner chamber and rests upon the coarse wire screen 28, while the unpopped corn falls through such screen and rests upon the peripheral wall of the center compartment and is again subjected to the action of the heat. In the continued rotation of the cylinder the corn in the outer chamber of the center compartment is redelivered to the inner chamber of such compartment and the popped corn is held within the inner chamber, while the unpopped grains can fall through the screen 28 into the outer chamber. The popped corn passes from the center chamber through the chute 26 into the front compartment 22 and travels over the angular partition plate 36 and is collected by the chute 43 and directed into the hopper 41 by means of which the popped corn is discharged from the popping cylinder. When the gate 40 is swung into engagement with the peripheral wall of the center compartment the unpopped corn is directed into the chute 33 and passes through the latter and the discharge opening 37 into a refuse collector. In the present instance, this refuse collector comprises a hopper 81 having the upper edge thereof curved to conform to the curvature of the lower portion of the cylinder and surrounding the lower portion of the front compartment of the popping cylinder, such hopper discharging into a pipe 82.

From the foregoing description taken in connection with the accompanying drawings, the construction, mode of operation and manner of employing my improved corn popping machine will be readily apparent.

It will be seen that I have provided a corn popper whereby the corn will be thoroughly and quickly popped and the unpopped grains subjected to the action of the heat for a comparatively long time and finally discharged from the machine in the event of the same not popping.

The corn that is discharged from the hopper 41 preferably enters the butter mechanism so that such corn may be buttered. The hopper 1 and popping cylinder 10 and associated parts are mounted upon a suitable supporting frame and, if desired, the popping cylinder, heater, etc., may be inclosed in a glass case.

While I have herein shown and described the preferred form of my invention by way of illustration, I wish it to be understood that I do not limit or confine myself to the precise details of construction herein described and delineated, as modification and variation may be made within the scope of the claims without departing from the spirit of the invention.

I claim:

1. In a corn popping machine, a cylinder capable of rotary movement and divided by transverse partitions into a number of compartments adapted to receive the corn, chutes carried by the partitions establishing communication between said compartments whereby the corn will be delivered from one compartment to another by the rotation of the cylinder, means for heating said cylinder, and means for rotating said cylinder.

2. In a corn popping machine, a cylinder capable of rotary movement and divided vertically by partitions into a number of compartments adapted to receive the corn, chutes carried by the partitions establishing communication between said compartments whereby the corn will be delivered from one compartment to another by the rotation of the cylinder, means for heating said cylinder, means for rotating said cylinder, and means in one of said compartments for separating the popped corn from the unpopped corn.

3. In a corn popping machine, a cylinder capable of rotary movement and divided vertically by partitions into a number of compartments adapted to receive the corn, chutes carried by the partitions establishing communication between said compartments whereby the corn will be delivered from one compartment to another by the rotation of the cylinder, means for heating said cylinder, means for rotating said cylinder, means in one of said compartments for separating the popped corn from the unpopped corn, and means for discharging the unpopped corn from a particular compartment.

4. In a corn popping machine, a cylinder capable of rotary movement and divided vertically by partitions into rear, center and front compartments adapted to receive the corn, chutes carried by the partitions establishing communication between said compartments whereby the corn will be delivered from one compartment to another by the rotation of the cylinder, means for heating said cylinder, and means for rotating said cylinder.

5. In a corn popping machine, a cylinder capable of rotary movement and divided vertically by partitions into rear, center and front compartments adapted to receive the corn, chutes carried by the partitions establishing communication between said compartments whereby the corn will be delivered from one compartment to another by the rotation of the cylinder, means for heating said cylinder, means for rotating said cylinder, and means for delivering the raw corn to said rear compartment in predetermined quantities.

6. In a corn popping machine, a cylinder capable of rotary movement and divided vertically by partitions into rear, center and front compartments adapted to receive the corn, chutes carried by the partitions establishing communication between said compartments whereby the corn will be delivered from one compartment to another by the rotation of the cylinder, means for heating said cylinder, means for rotating said cylinder, a container in said rear compartment provided with a swinging bottom, means for delivering the raw corn to said container in predetermined quantities, and means for swinging the bottom of said container to open position at predetermined intervals.

7. In a corn popping machine, a cylinder capable of rotary movement and divided vertically by partitions into rear, center and front compartments adapted to receive the corn, chutes carried by the partitions establishing communication between said compartments whereby the corn will be delivered from one compartment to another by the rotation of the cylinder, means for heating said cylinder, means for rotating said cylinder, a container in said rear compartment provided with a swinging bottom, means for delivering the raw corn to said container in predetermined quantities, and automatic means for swinging the bottom of said container to open position at predetermined intervals.

8. In a corn popping machine, a cylinder capable of rotary movement and divided by transverse partitions into a number of compartments adapted to receive the corn, chutes carried by the partitions establishing communication between said compartments whereby the corn will be delivered from one compartment to the other by the rotation of the cylinder, means for heating said cylinder, means for rotating said cylinder, means for deflecting the unpopped corn out of certain of the compartments independently of the popped corn, and means for rendering said last-named means active at predetermined intervals.

In testimony whereof I affix my signature in presence of two witnesses.

CHARLES E. McCARREN.

Witnesses:
  B. T. ARCHER,
  A. BONNHEIM.

Copies of this patent may be obtained for five cents each, by addressing the "Commissioner of Patents, Washington, D. C."